(No Model.)

J. W. SMITH.
OVERSHOE FOR HORSES.

No. 288,880. Patented Nov. 20, 1883.

WITNESSES:

INVENTOR:
J. W. Smith

BY
ATTORNEYS.

UNITED STATES PATENT OFFICE.

JAMES W. SMITH, OF JERSEY CITY, NEW JERSEY.

OVERSHOE FOR HORSES.

SPECIFICATION forming part of Letters Patent No. 288,880, dated November 20, 1883.

Application filed May 23, 1883. (No model.)

*To all whom it may concern:*

Be it known that I, JAMES W. SMITH, of Jersey City, Hudson county, New Jersey, have invented a new and Improved Overshoe for Horses, of which the following is a full, clear, and exact description.

The object of my invention is to provide a new and improved overshoe adapted to be fastened on horses' hoofs to prevent them from slipping on icy and slippery roads and inclines, the overshoe giving additional weight to the horse's hoof to insure the hold on the surface.

The invention consists of the combination and arrangement of parts, substantially as hereinafter fully set forth and claimed.

Reference is to be had to the accompanying drawings, forming part of this specification, in which similar letters of reference indicate corresponding parts in both figures.

Figure 1:
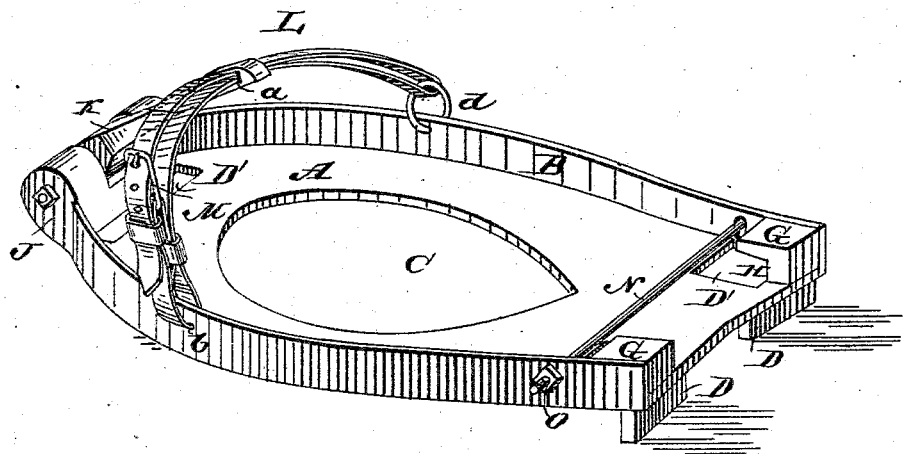
Figure 2:
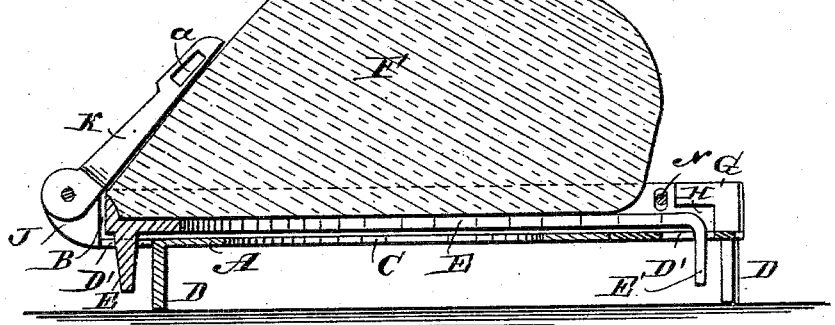

Figure 1 is a perspective view of my new and improved overshoe for horses; and Fig. 2 is a longitudinal sectional elevation of the same, showing the manner in which it is fastened on the hoof.

A metal plate A, of the shape of the bottom of a horse's hoof, is provided along the edge with an upwardly-projecting flange, B. An opening, C, is formed in the central part of the plate A for the purpose of decreasing the weight. At the front and at each side of the rear end downwardly-projecting calks D are formed on the plate by pressing down part of the metal of the plate A, whereby holes D' will be formed for receiving the calks E' of the shoe E, fastened on the horse's hoof F. The said calks D are made very strong, and hardened, and are provided with steel edges in case the plate A is made of iron; but I prefer to make the said plate A of steel throughout. Two blocks, G, are fastened on the rear part of the upper surface of the plate A—one at each side—which blocks are provided with recesses H in the under side at the ends toward the front of the plate. Jaws J are formed on the outer surface of the flange B, and on the said jaws an arm, K, is pivoted, which is provided in its free end with a slot, *a*, or with a loop. A strap, L, having a buckle, M, is passed through a slot, *b*, in the flange B, on one side of the plate, through the slot or loop *a*, in the pivoted arm K, and through a ring, *d* in the flange B on the other side of the plate A. The flange B can be provided on both sides with slots *a*, or on both sides with rings *d*, if desired.

The overshoe is fastened on the horse's hoof in the following manner: The plate A is placed against the bottom of the hoof in such a manner that the calks E' of the horseshoe E will pass through the holes D' in the plate A, and the rear ends of the shoe E will be below the blocks G. The pivoted arm K is swung against the front of the hoof, the strap L is passed through the slot *b*, the ring *d*, and the loop or slot *a* in the manner shown, and drawn taut and held thus by means of the buckle. The overshoe will then hold firmly on the hoof. If desired, a rod, N, can be passed through the flanges B and over the rear of the shoe, and can be drawn taut and held in place by a nut, O, screwed on a threaded end of the rod.

The above-described overshoe can be fastened on the horse's hoof very rapidly when required, and can be removed very rapidly, and does not require the usual horseshoe on the hoof to be removed.

If a horse has on my improved overshoe, it cannot slip on icy or wet pavements, steep ferry-bridges, inclines, &c., as the heavy, strong, and hard calks D of the overshoe enable it to get a firm grip.

Having thus described my invention, I claim as new and desire to secure by Letters Patent—

1. The combination, with a plate provided with an upwardly-projecting flange, B, and calks, D, of the arm K, pivoted to the front end of the plate, and of the strap L, passed through slots or rings in the flange and through a slot or loop in the free end of the arm K, substantially as herein specified.

2. The combination, with the plate A, having a flange, B, calks D, and recessed blocks G at the rear ends, of an arm pivoted to the front of the plate, and a strap passed through slots or rings in the flanges and through a loop in the free end of the pivoted arm, substantially as herein specified.

JAMES WELDER SMITH.

Witnesses:
O. F. GUNZ,
C. SEDGWICK